May 13, 1941.  E. D. KELLER  2,241,463
GROUND SUPPORTED PLANT HOLDER
Filed May 22, 1940
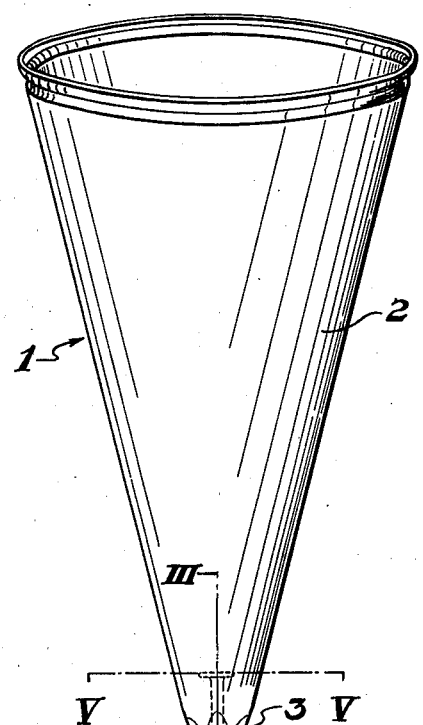
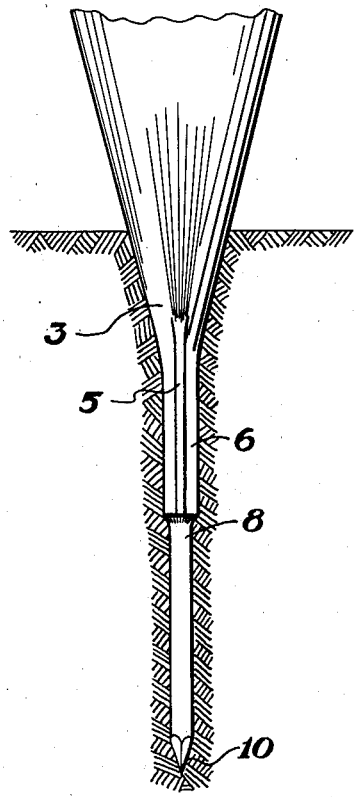
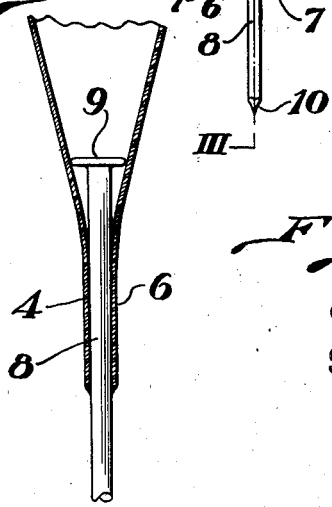
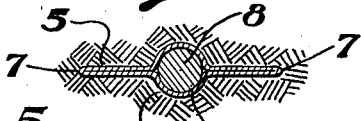
Inventor
Elizabeth D. Keller
By W. S. McDowell
Attorney Patented May 13, 1941

2,241,463

UNITED STATES PATENT OFFICE 2,241,463

GROUND SUPPORTED PLANT HOLDER

Elizabeth D. Keller, Columbus, Ohio

Application May 22, 1940, Serial No. 336,615

7 Claims. (Cl. 47—41)

This invention relates to articles or devices of the type which carry or are formed with pointed extremities adapted for ready insertion into ground soil or other penetrable beds, for affording convenient means for maintaining such articles or devices in stable upright positions.

It is a primary object of the present invention to provide a garden appliance in the form of a flower or plant holder having an inverted hollow conical body, and wherein the lower or apex-region of the holder is formed for convenient penetration into the earth, so that the holder, when so disposed, will be actively maintained in an upright or display position solely by the engagement existing between its attenuated apex and the earth.

Another object resides in the provision of a holder of the character set forth which presents an artistic and pleasing appearance when in use and wherein strong, substantial and improved means are provided at the lower smaller end of the device to facilitate its insertion into a penetrable supporting bed.

With these and other objects in view that will appear as the description proceeds, the invention consists in the novel combinations of elements, arrangements of parts, and in various related features of construction hereinafter more fully set forth and described.

In the accompanying drawing:

Fig. 1 is a perspective view of the improved ground supported floral holder comprising the present invention;

Fig. 2 is a side elevational view of the lower portion of the holder, illustrating the latter when operatively inserted in a supporting bed;

Fig. 3 is a detail vertical sectional view taken through the lower portion of the holder on the plane indicated by the line III—III of Fig. 1;

Fig. 4 is a horizontal sectional view on the plane indicated by the line IV—IV of Fig. 1.

Fig. 5 is a similar view on the plane indicated by the line V—V of Fig. 1.

Referring more particularly to the drawing, the numeral 1 designates the improved floral holder in its entirety. In the specific embodiment of the holder, illustrated in the drawing, the same comprises an inverted, hollow, substantially conical body 2. This body may be formed from any suitable materials, but it has been found preferable to form the same from sheet metal, at least in part.

The conical shape of the body readily adapts the holder for the reception of plants, or cut or growing flowers and, in addition, the lower, pointed apex-region of the body facilitates the insertion of the latter into the soil. To attain this objective in an improved and more facile manner, the lower apex-forming region 3 of the body 2 is deformed during manufacture to produce an elongated vertical passage 4 of substantially uniform diameter throughout its length. Also, the region 3 is further shaped to provide a plurality of stabilizing wings 5, which project laterally from the tubular wall 6 defining the passage 4. The wings 5 are formed with downwardly converging outer edges 7 and, as shown in Fig. 4, the side wings are substantially flat in a transverse direction. By the provision of suitable forming dies, not shown, the tubular wall 6 and the wings 5 may be readily formed in the original truly conical body of the holder.

Positioned in the passage 4 is a shank member 8. This member may comprise an ordinary nail, the head of which is indicated at 9 and its pointed extremity at 10. It will be noted that the shank member closes the lower end of the body 2, and is of such length as to project below the tubular wall 6, so that the pointed extremity 10 thereof will be substantially spaced from the wings 5. If desired, the intermediate portion of the shank member may be soldered or spot-welded to the wall 6 so that any longitudinal movement of the shank member within the passage 4 will be prevented.

By utilizing these constructional features, it will be seen that the present invention provides a floral display device, which with the employment of slight manual effort, may be readily inserted into the ground to a sufficient extent so that the device will maintain an upstanding vertical position well adapted for the effective display of plants, flowers or other articles received thereby. The pointed shank member enables initial penetration of the lower end of the holder into the ground to be readily effected and final stability is obtained by the penetration of the wings 5 into the earth, followed by the penetration of the lower tapered portions of the body which are disposed slightly above the wings.

Due to the flat sided formation of the wings 5, undesired rotative movement of the holder about a vertical axis is also resisted. Generally, the construction of the lower end of the holder will enable almost anyone using hand applied forces to insert the lower portion of the holder sufficiently into the earth to maintain the holder in its desired upright position and prevent the same from falling over on its side.

It has been found, in actual practice, that superior results can be obtained by using a nail having a large head rather than a nail of the "finishing" or "headless" type. By reason of the large head, the nail will be prevented from dropping completely to the bottom of the conical body and, therefore, when the wings are formed, the head will be spaced from the tubular wall portion 6, as shown in Fig. 3, to reenforce the body against any tendency to fold or bend over at the upper ends of the wing portions 5. The head on the nail serves to hold the sides of the body spaced and provides a tubular form, illustrated in Fig. 5, which greatly resists forces tending to collapse the body in this region.

While the invention has been specifically described as being applicable to a floral holder, it is obvious that its mechanical features are applicable to other appliances of the type which are supported by soil penetration, such, for example, as cemetery vases, garden tables or drinking tumbler supports.

What is claimed is:

1. A garden appliance comprising a hollow inverted conical body having its apex-forming region shaped to provide an elongated, vertical passage and a plurality of adjoining, laterally projecting, downwardly converging, transversely flat, ground penetrating, stabilizing wings, and a shank member fixedly positioned in said passage and closing the same, the lower end of said shank member projecting below said wings and terminating in a pointed end.

2. A ground-supported floral holder comprising a hollow inverted conical body, the latter having its lower apex-forming region deformed to provide a tubular extension and laterally projecting stabilizing wings, said wings being substantially flat in transverse cross section and having the outer edges thereof angled to converge at the lower end of said extension, and a soil-penetrating shank secured to said tubular extension and projecting below the same.

3. A soil-supported garden appliance comprising a body having the lower end thereof formed with a depending substantially tubular extension, fixed wings projecting laterally from the sides of said extension, said wings being substantially flat in transverse cross section and having the outer edges thereof disposed in downwardly converging relationship, and a soil-penetrating shank member secured to said tubular extension.

4. A soil-supported plant or floral holder, comprising an inverted hollow conical body, the lower end of said body being flattened upon itself to form stabilizing wings having downwardly converging outer edges, said body between said wings being formed with a tubular extension, and a soil-penetrating shank member positioned within said tubular extension and projecting below the same.

5. A garden appliance comprising a hollow conical body, a headed soil penetrating shank secured to the smaller end of said body and projecting therefrom, said body being flattened at opposite sides at the smaller end to provide a pair of stabilizing wings, the head of said shank being disposed within said body between the flattened portion and the larger end.

6. A garden appliance comprising a hollow conical body formed from sheet metal, a headed shank disposed axially of said body and extending through the smaller end thereof, said shank being permanently secured in said body, and stabilizing wings formed at the smaller end of said body at opposite sides of said shank, the head of said shank being spaced from the smaller end of said body and said wings.

7. A garden appliance comprising a sheet metal body of conical formation, the smaller end of said body being flattened at opposite sides to provide a tubular section with oppositely disposed web-like wings on the outer sides, a shank extending through said tubular section and rigidly secured therein, and a head on the inner end of said shank, said head engaging the inner surface of said body in spaced relation from said flattened portion to locate said shank and reenforce the lower end of said body.

ELIZABETH D. KELLER.